UNITED STATES PATENT OFFICE.

THOMAS GARE, OF NEW BRIGHTON, ENGLAND.

MANUFACTURE, MOLDING, AND REMOLDING OF INDIA-RUBBER GOODS.

1,023,729.  Specification of Letters Patent.  Patented Apr. 16, 1912.

No Drawing.   Application filed August 13, 1910.   Serial No. 576,966.

*To all whom it may concern:*

Be it known that I, THOMAS GARE, subject of the King of Great Britain, residing at Bramble Beach, Warren Drive, New Brighton, in the county of Chester, England, engineer, have invented certain new and useful Improvements Relating to the Manufacture, Molding, and Remolding of India-Rubber Goods, of which the following is a specification.

My invention relates to the manufacture, molding and remolding of india-rubber goods according to the process described and claimed in my specification No. 332103 filed Aug. 27 1906 and it has for its object an improved method of carrying the process into effect.

By the process hereinbefore referred to, the rubber, whether in one piece or many pieces or in powder, is pressed sufficiently to expel the air from the mold and subsequently heated to a temperature sufficient to convert the rubber into a homogeneous mass taking the shape of the mold without in any way deteriorating the character of the rubber.

According to my present invention, I compress the rubber to expel the air by means of a hot plate or plates, but I interpose between the plate or plates and the rubber a sheet or sheets of a suitable material which will retard the transmission of the heat of the plate to the rubber until after the rubber has been compressed to expel the air.

In practice I find a piece of paper or a thin plate of metal is sufficient to delay the action of the heat during the compression of the rubber if accomplished rapidly, by affording a temporary insulation. Advantage may be taken of this fact to produce an ornamented surface or relief design on rubber by placing a temporarily-insulating sheet upon the rubber or powdered rubber and then placing thereupon a heated plate, which is of a temperature higher than ordinary vulcanization heat, and immediately subjecting the whole to pressure until the plate has cooled below the temperature at which the rubber would be likely to resume its original shape.

The invention is applicable for use in connection with the apparatus described in my specification No. 576965 filed Aug. 13, 1910, and shown in Figures 9 and 10 of the drawings as an alternative to the heating of the tubular mold. For this purpose I may heat the plates before delivering them to the mold and interpose a temporarily insulating sheet between the hot plates and the rubber so that the full compression and expulsion of air from the rubber is accomplished before the heat begins to affect the rubber.

Claim:—

The method of manufacturing, molding, and remolding india rubber goods consisting in comminuting the rubber placing upon or against the comminuted rubber a sheet of a temporarily heat-insulating material and subjecting the rubber thus protected to compression by a presser member which has been previously heated to a temperature above ordinary vulcanization heat, to compress the rubber and expel the air therefrom, the interposition of said sheet serving to retard the transmission of heat from said presser member to the rubber until after the full compression of said rubber and expulsion of air from the same have been effected.

In testimony whereof I have hereunto set my hand in presence of two subscribing witnesses.

THOMAS GARE.

Witnesses:
GEORGE C. DOWNING,
WALTER J. SKERTEN.